United States Patent [19]

Bilyk

[11] Patent Number: 5,984,253
[45] Date of Patent: Nov. 16, 1999

[54] METHOD AND APPARATUS FOR PARKING A MOTORCYCLE

[76] Inventor: Richard Bilyk, Box 72, Holden, Alberta, Canada, T0B 2C0

[21] Appl. No.: 08/876,497

[22] Filed: Jun. 16, 1997

[51] Int. Cl.[6] .................................................... B60S 13/02
[52] U.S. Cl. ........................................... 248/346.5; 104/35
[58] Field of Search ............................. 248/346.5, 349.1, 248/352; 211/17, 20, 22, 19; 104/35

[56] References Cited

U.S. PATENT DOCUMENTS

| | | | |
|---|---|---|---|
| 2,135,765 | 11/1938 | Paine | 269/69 |
| 3,583,326 | 6/1971 | Poissant | 104/35 |
| 3,788,414 | 1/1974 | Netter | 414/743 |
| 3,912,098 | 10/1975 | Nicotra | 414/462 |
| 4,901,647 | 2/1990 | Drabing | 104/44 |
| 5,006,072 | 4/1991 | Letovsky | 434/61 |
| 5,452,909 | 9/1995 | Zinski | 280/79.4 |
| 5,609,461 | 3/1997 | Lichtenberg | 414/426 |

*Primary Examiner*—Ramon O. Ramirez
*Assistant Examiner*—Anita M. King
*Attorney, Agent, or Firm*—David and Bujold

[57] ABSTRACT

A method and apparatus for parking a motorcycle includes a base and an elongate body rotatably mounted on the base. The body a trough that extends between and is accessible from either of a first end or a second end. The trough is at least as long as a wheelbase of a motorcycle and at least as wide as a motorcycle tire. A motorcycle is driven onto the body and along the trough until the motorcycle is fully supported by the body off the ground in a state of balanced equilibrium. Manual motive force is provided by the rider to rotate the body about the base while the rider remains seated to provide lateral stability to the motorcycle.

4 Claims, 4 Drawing Sheets

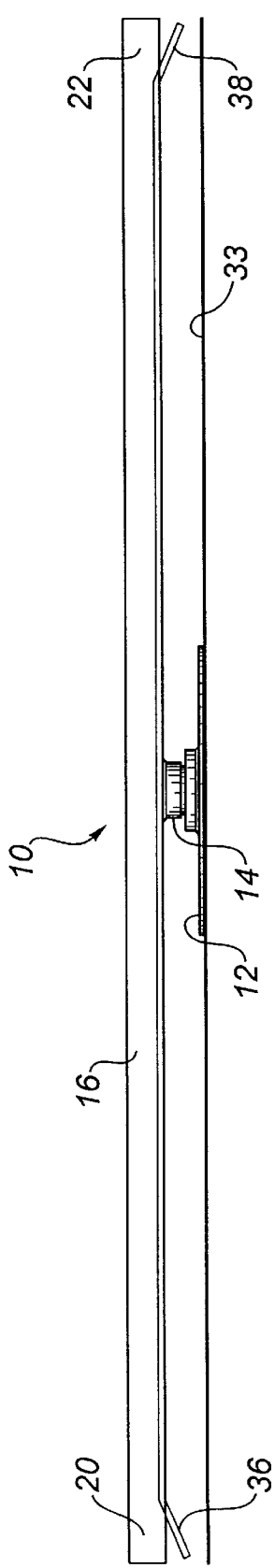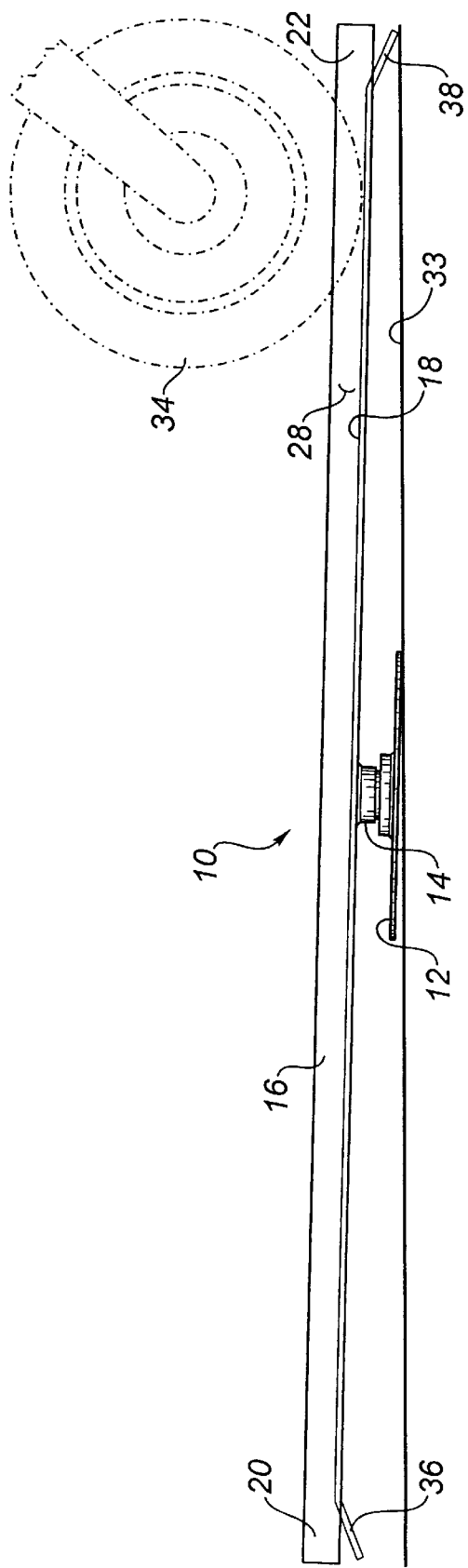

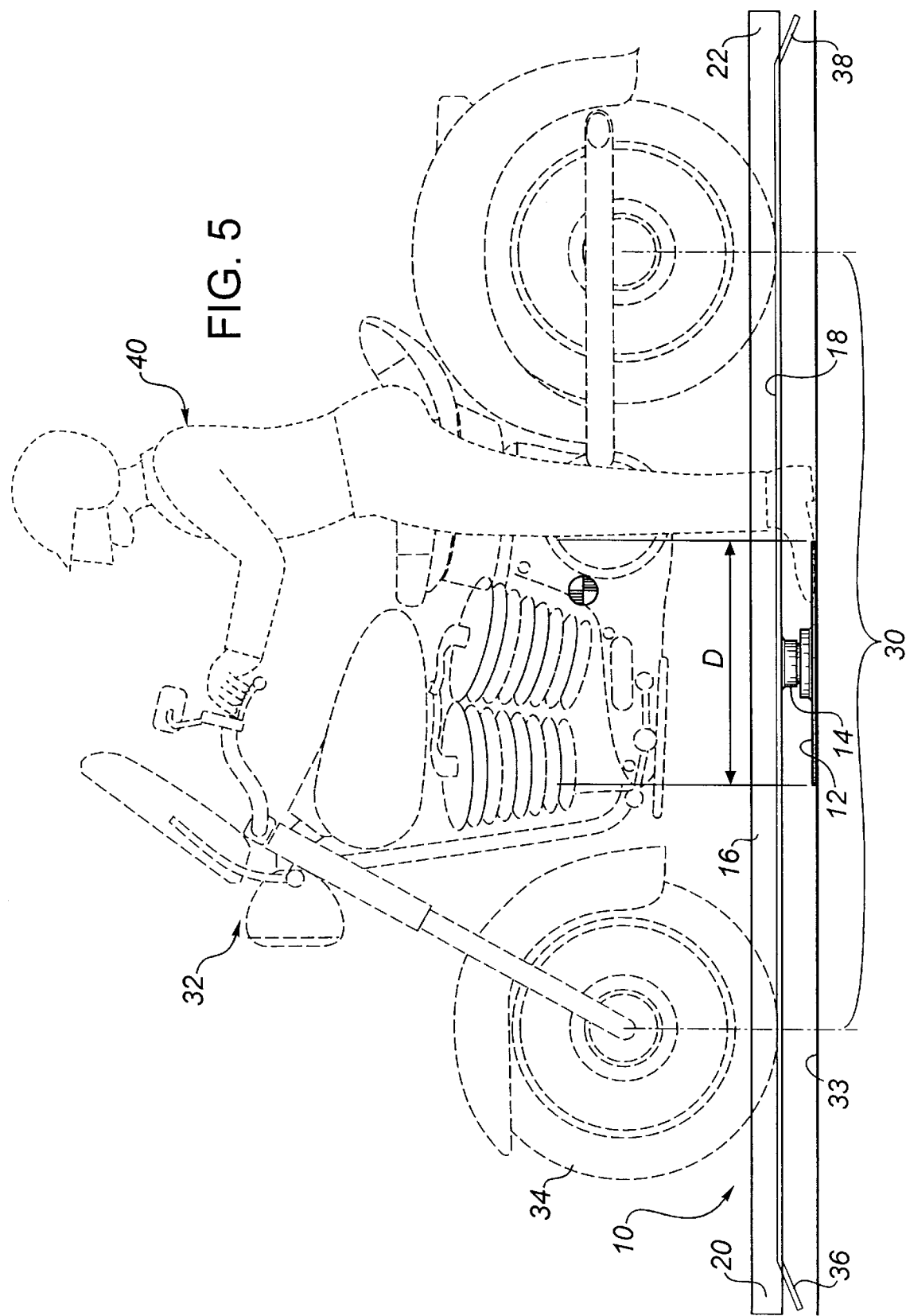

METHOD AND APPARATUS FOR PARKING A MOTORCYCLE

FIELD OF THE INVENTION

The present invention relates to a method and apparatus for parking a motorcycle.

BACKGROUND OF THE INVENTION

When parking a motorcycle in a confined space, such as a garage, it is preferable to turn the motorcycle around so that the motorcycle can be driven out of the confined parking space.

Turning the motorcycle around in the confined space involves a series of forward and backward movements with each series of movements moving the motorcycle through only 15 to 30 degrees of a 180 degree movement.

SUMMARY OF THE INVENTION

What is required is a method and apparatus for parking a motorcycle which will enable it to be turned around with less time and effort.

According to one aspect of the present invention there is provided an apparatus for parking a motorcycle, which includes a base and an elongate body rotatably mounted on the base. The body has a first end, a second end, and a trough that extends between and is accessible from either the first end or the second end. The trough is at least as long as a wheelbase of a motorcycle and at least as wide as a motorcycle tire.

A motorcycle is driven onto the body and along the trough until the motorcycle is fully supported by the body off the ground in a state of balanced equilibrium. Manual motive force is provided by the rider to rotate the body about the base while the rider remains seated to provide lateral stability to the motorcycle.

BRIEF DESCRIPTION OF THE DRAWINGS

These and other features of the invention will become more apparent from the following description in which reference is made to the appended drawings, wherein:

FIG. 3 is a first side elevation view of the apparatus for parking a motorcycle illustrated in FIG. 1.

FIG. 4 is a second side elevation view of the apparatus for parking a motorcycle illustrated in FIG. 1, with a motorcycle in the process of mounting onto the apparatus.

FIG. 5 is a third side elevation view of the apparatus for parking a motorcycle illustrated in FIG. 1, with the motorcycle fully mounted onto the apparatus.

DETAILED DESCRIPTION OF THE PREFERRED EMBODIMENT

Figure 1:
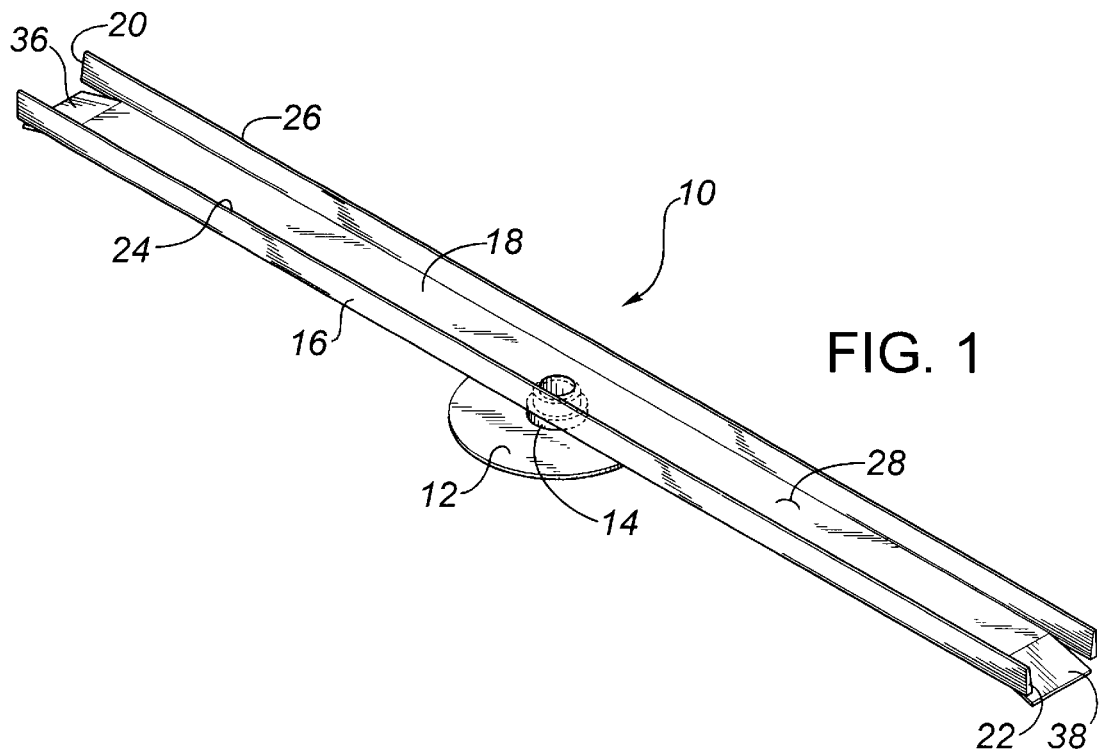
FIG. 1 is a perspective view of an apparatus for parking a motorcycle constructed in accordance with the teachings of the present invention.

The preferred embodiment, an apparatus for parking a motorcycle generally identified by reference numeral 10, will now be described with reference to FIGS. 1 through 7.

Figure 2:
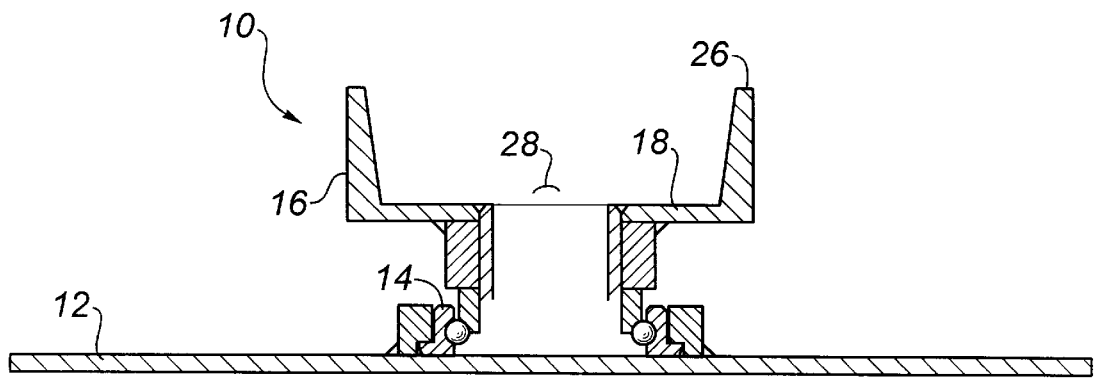
FIG. 2 is an end elevation view, in section, of the apparatus for parking a motorcycle illustrated in FIG. 1.
Figure 6:
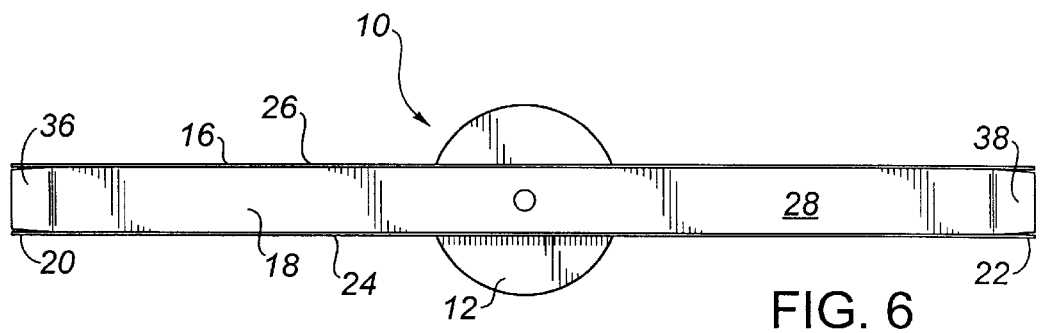
FIG. 6 is a first top plan view of the apparatus for parking a motorcycle illustrated in FIG. 1.

Referring to FIGS. 1 through 3, an apparatus 10 includes a plinth-like base 12, a bearing 14 secured to base 12, and an elongate body 16 rotatably mounted by means of bearing 14 onto base 12. Body 16 has a bottom 18, a first end 20, a second end 22, and parallel sidewalls 24 and 26 that extend substantially vertically from bottom 18. It is preferred that bearing 14 be positioned at the center of gravity of body 16 which, unless there is an unequal weight distribution along body 16, will normally be equidistant between first end 20 and second end 22. Sidewalls 24 and 26 along with bottom 18 define a trough 28 that extends between first end 20 and second end 22. Referring to FIG. 5, trough 28 is at least as long as a wheelbase 30 of a motorcycle 32 and at least as wide as a motorcycle tire 34. Trough 28 is accessible from either first end 20 or second end 22, by means of integrally formed ramps 36 and 38 that are positioned at first end 20 and second end 22, respectively, of trough 28. Ramps 36 and 38 facilitate entry of motorcycle tire 34 into trough 28.

Figure 7:
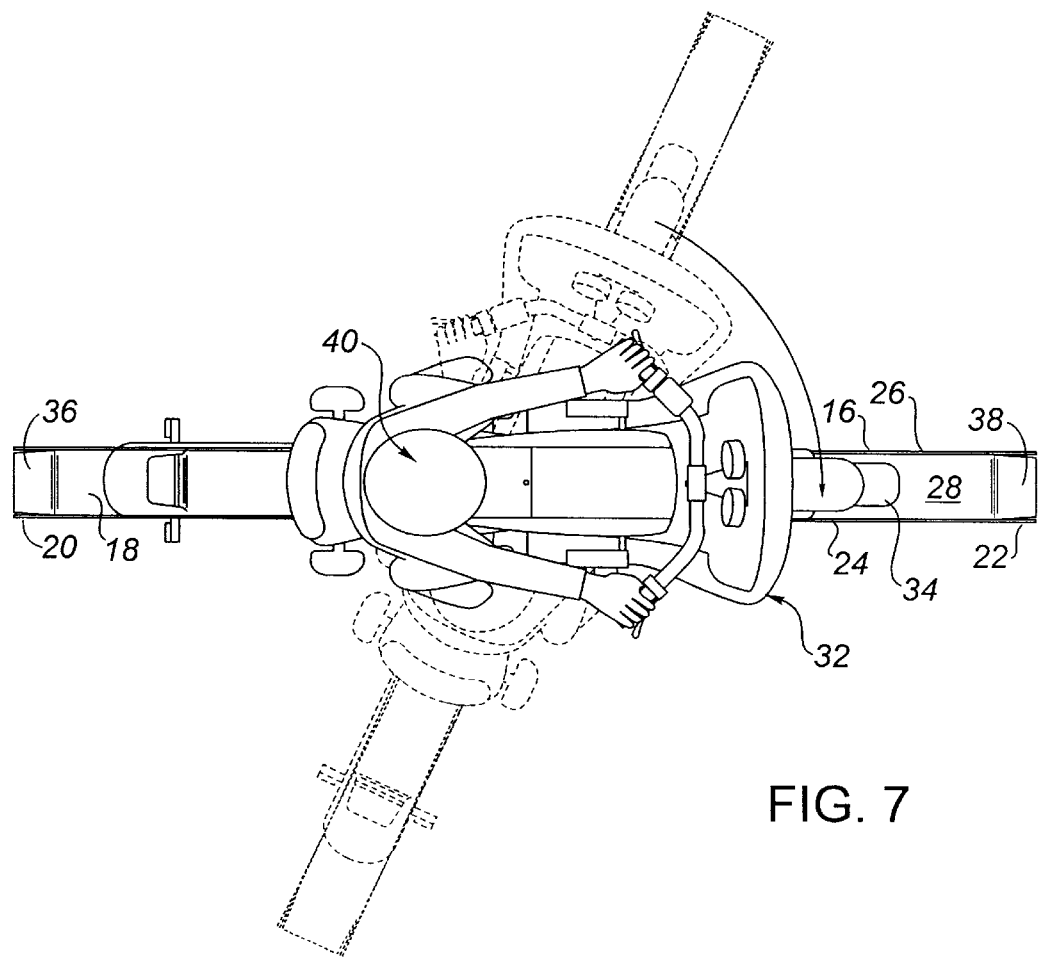
FIG. 7 is a second top plan view of the apparatus for parking a motorcycle illustrated in FIG. 1, with a motorcycle mounted onto the apparatus and the apparatus in the process of rotating.

The method of use of apparatus 10 will now be described with reference to FIGS. 1 through 7. The first step of the method is to provide a turntable apparatus substantially as described with respect to the preferred embodiment of apparatus 10 and illustrated in FIGS. 1 through 3 and 6. The second step driving motorcycle 32 onto body 16 and along trough 28 until motorcycle 32 is fully supported by body 16 off ground 33 in a state of balanced equilibrium. Referring to FIG. 4, mounting onto body 16 is facilitated by one of ramps 36 or 38. FIG. 5, illustrates motorcycle 32 in a state of balanced equilibrium fully supported by body 16 off ground 33. Referring to FIG. 7, the third step involves a rider 40 providing motive force to rotate body 16 about base 12, while rider 40 remains seated to provide lateral stability to motorcycle 32. Rider 40 can rotate body 16 to either his left or his right.

Referring to FIG. 5, the width or diameter of base 12, marked as "D", is kept relatively small with stability being obtained as a result of balancing motorcycle 32 on body 16. Referring to FIG. 4, ramps 36 and 38 facilitate motorcycle tire 34 mounted onto body 16 and base 12 may tip slightly to facilitate such mounting. When it tips one of ramps 36 or 38 will rest upon ground 33, which takes the strain off bearing 14. Once motorcycle 32 has been turned around, it is anticipated that it will be moved off of body 16 to its normal parking position. This leaves apparatus 10 available to accommodate the next motorcycle. It also enables an automobile to be parked over top of the low profile of apparatus 10.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. An apparatus for parking a motorcycle, comprising:

a base;

an elongate body rotatably mounted on the base by a centrally positioned weight bearing fulcrum, the body having a first end, a second end, and a trough that extends between and is accessible from the first end and the second end, the trough adapted to be at least as long as a wheelbase of the motorcycle and at least as wide as a motorcycle tire, the trough having wheel support positions on opposed sided of the weight bearing fulcrum for supporting the motorcycle, the body being vertically pivotally positionable about the fulcrum between a first position where the first end is in contact with a ground supporting surface and the second end is raised above the ground supporting surface, a second position where the body is balanced on the weight bearing fulcrum with neither end contacting the ground supporting surface, and a third position where the second end is in contact with the ground supporting surface and the first end is raised above the ground supporting surface; and whereby for parking, the body is vertically pivoted to the first position, the motorcycle, via the first end in contact with the ground, is advanced into the trough as far as the wheel support positions until the body is pivoted to the second position under the action of the weight of the motorcycle, the motorcycle and the body thereby being balanced on the weight bearing fulcrum, the motorcycle and the body are rotated about the fulcrum, the motorcycle is advanced in order to pivot the body to the third position, the second end thus being in contact with the ground for allowing the motorcycle to advance through the trough and exit the parking apparatus.

2. The apparatus for parking the motorcycle as defined in claim 1, wherein a ramp is positioned at each of the first end and the second end of the body for contacting the ground and for facilitating the motorcycle entering the trough when the body is in the first or third position.

3. An apparatus for parking a motorcycle, comprising:

a plinth-like base;

a bearing secured to the base;

an elongate body rotatably mounted about its center of gravity by the bearing to swing freely without engaging a ground surface upon which the base is supported, the body having a bottom, a first end, a second end, and parallel sidewalls that extend substantially vertically from the bottom to define a trough that extends between and is accessible from the first end and the second end, the trough adapted to be at least as long as a wheelbase of the motorcycle and at least as wide as a motorcycle tire, the trough having wheel support portions on each side of the bearing, the body being balanced on the bearing;

a ramp positioned at each of the first end and the second end of the body, thereby facilitating entry of the motorcycle tire into the trough;

the body being vertically pivotally positionable about the bearing and base between a first position where the ramp at the first end is in contact with the ground supporting surface and the second end is raised above the ground supporting surface, a second position where the body is balanced on the bearing with neither ramp contacting the ground supporting surface, and a third position where the ramp at the second end is in contact with the ground supporting surface and the first end is raised above the ground supporting surface; and whereby for parking, the body is pivoted to the first position, with the motorcycle being advanced, via the ramp at the first end in contact with the ground, into the trough, as far as the wheel support portions, with the body vertically pivoting to the second position under the action of the weight of the motorcycle, the motorcycle and the body thereby being balanced on the bearing, the motorcycle and the body being rotated about the bearing, and the motorcycle being advanced in order to pivot the body to the third position, the ramp at the second end thus contacting the ground for allowing the motorcycle to advance through the trough and exit the parking apparatus.

4. A method for parking a motorcycle, comprising the steps of:

firstly, providing a turntable comprising:

a base;

an elongate body rotatably mounted on the base by a centrally positioned weight bearing fulcrum, the body having a first end, a second end, and a trough that extends between and is accessible from the first end and the second end, the trough adapted to be at least as long as a wheelbase of the motorcycle and at least as wide as a motorcycle tire and having wheel support portions on each side of the weight bearing fulcrum, the body being balanced on the weight bearing fulcrum, and the body being vertically pivotally positionable about the fulcrum between a first position where the first end is in contact with a ground supporting surface and the second end is raised above the ground supporting surface, a second position where the body is balanced on the weight bearing fulcrum with neither end contacting the ground supporting surface, and a third position where the second end is in contact with the ground supporting surface and the first end is raised above the ground supporting surface;

secondly, vertically pivoting the body to the first position;

thirdly, driving the motorcycle onto the body and along the trough in order to pivot the body to the second position, with the motorcycle thus being fully supported by the body off the ground in a state of balanced equilibrium; and fourthly, providing manual motive force to rotate the body about the base while a rider remains seated to provided lateral stability to the motorcycle.

* * * * *